United States Patent
Yankielun

(10) Patent No.: US 7,141,815 B2
(45) Date of Patent: Nov. 28, 2006

(54) FIBER OPTIC-BASED PROBE FOR USE IN SALTWATER AND SIMILARLY CONDUCTIVE MEDIA AS FOUND IN UNENCLOSED NATURAL ENVIRONMENTS

(75) Inventor: Norbert E. Yankielun, Lebanon, NH (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 141 days.

(21) Appl. No.: 10/767,600

(22) Filed: Jan. 30, 2004

(65) Prior Publication Data
US 2004/0169132 A1    Sep. 2, 2004

(51) Int. Cl.
*G01N 15/06*    (2006.01)
*G01N 1/10*    (2006.01)
*G01J 1/04*    (2006.01)
*G02B 6/00*    (2006.01)

(52) U.S. Cl. .................. 250/577; 250/227.11; 385/12; 73/170.32

(58) Field of Classification Search .......... 250/227.14, 250/559.42, 559.43, 559.27, 573, 559.22, 250/559.4, 577, 900–908, 221, 227.11, 227.25; 385/12; 73/170.32, 53.01, 61.69, 61.71, 73/170.29
See application file for complete search history.

(56) References Cited

U.S. PATENT DOCUMENTS

| | | | |
|---|---|---|---|
| 3,995,168 A * | 11/1976 | Neuscheler et al. | 250/577 |
| 4,287,756 A * | 9/1981 | Gallagher | 73/64.55 |
| 4,289,398 A | 9/1981 | Robichaud | |
| 4,544,840 A * | 10/1985 | Keller | 250/227.23 |
| 4,927,266 A * | 5/1990 | Sugiura et al. | 250/205 |
| 5,143,041 A | 9/1992 | Franzke | |
| 5,467,194 A * | 11/1995 | Pellinen et al. | 250/559.29 |
| 5,743,135 A * | 4/1998 | Sayka et al. | 73/293 |
| 5,754,284 A | 5/1998 | Leblanc et al. | |
| 5,784,338 A | 7/1998 | Yankielun et al. | |
| 5,790,471 A | 8/1998 | Yankielun et al. | |
| 5,968,371 A | 10/1999 | Verdegan et al. | |
| 6,084,393 A | 7/2000 | Yankielun | |
| 6,286,363 B1 | 9/2001 | Discenzo | |
| 6,356,675 B1 * | 3/2002 | Weiss | 250/227.14 |
| 6,373,617 B1 * | 4/2002 | Boffi et al. | 359/250 |
| 6,574,425 B1 | 6/2003 | Weiss et al. | |
| 6,594,004 B1 | 7/2003 | Makita | |
| 6,611,322 B1 | 8/2003 | Nakayama et al. | |

(Continued)

*Primary Examiner*—Georgia Epps
*Assistant Examiner*—Pascal M. Bui-Pho
(74) *Attorney, Agent, or Firm*—Earl H. Baugher, Jr.

(57) ABSTRACT

Arrays of optical fibers connected to specially configured electronics, e.g., a phototransistor, an LED, an amplifier, a detector, and display, software and PCMCIA A/D board available on a personal computer, are used to obtain continuous real-time acquisition, processing, and visualization of change in a media occurring in natural environments. Alternatively, many of the individual circuit elements above may be replaced with a power meter. In a specific application, data are collected on the depth of sediment below a body of water. As the sediment depth is changed by an event, the ends of the optical fibers in the array display a different reflection or transmission coefficient indicating that water has replaced sediment or vice versa. By knowing which of the optical fiber ends in the array is indicating the changed reflection or transmission coefficient, scour depth or silt accretion may be estimated. A method of employment of the system is also described.

23 Claims, 7 Drawing Sheets

U.S. PATENT DOCUMENTS 6,644,095 B1 11/2003 Van Mullekom et al.
6,698,900 B1* 3/2004 Young et al. ................ 353/79

2003/0117154 A1 6/2003 Yankielun et al.

* cited by examiner

US 7,141,815 B2

FIBER OPTIC-BASED PROBE FOR USE IN SALTWATER AND SIMILARLY CONDUCTIVE MEDIA AS FOUND IN UNENCLOSED NATURAL ENVIRONMENTS

STATEMENT OF GOVERNMENT INTEREST

Under paragraph 1(a) of Executive Order 10096, the conditions under which this invention was made entitle the Government of the United States, as represented by the Secretary of the Army, to the entire right, title and interest in any patent granted thereon by the United States. This and related patents are available for licensing. Please contact Sharon Borland at 703 428-9112.

BACKGROUND

Scour is a severe problem that results in millions of dollars of damage to infrastructure and loss of life annually. Scour occurs during times of high tides, hurricanes, rapid river flow and icing conditions when sediment, including rocks, gravel, sand, and silt are transported by the currents, undermining bridge pier foundations, submarine utility cables and pipelines, and filling in navigational channels. Scour is dynamic; ablation and deposition can occur during the same high-energy hydrodynamic event, so the worst-case net effect cannot be easily predicted nor previously monitored in real-time.

Several bridge scour monitoring technologies exist, including several patented electromagnetic sensors, including U.S. Pat. No. 5,784,338, Time Domain Reflectometry System for Real-Time Bridge Scour Detection and Monitoring, to Yankielun, N. E. and L. Zabilansky, Jul. 21, 1998; U.S. Pat. No. 5,790,471, Water/Sediment Interface Monitoring System Using Frequency Modulated Continuous Wave, to Yankielun and Zabilansky Aug. 4, 1998; and U.S. Pat. No. 6,084,393, Scour Probe Assembly, to Yankielun, Jul. 4, 2000.

These technologies, employing metallic time domain reflectometry (TDR) and frequency-modulated continuous wave FM-CW reflectometry have proved highly successful in detecting, monitoring and measuring scour and deposition of sediments in freshwater. However, they are of limited utility, or even unusable in conductive media such as brackish water, seawater, or in clays and some contaminated soils. Consequently, the technologies may be deployed only in inland (fresh) bodies of water having sediments comprising non-cohesive (non-clay-based) soils.

Dr. Yankielun developed an optical TDR-based (OTDR) scour probe that relies on "micro-bending" in an optical fiber. This micro-bending is caused by the impinging pressure of sediments on a specially configured optical fiber to indicate the extent of scour depth. The technology is described in U.S. Pat. No. 6,526,189, Scour Sensor Assembly, to Yankielun, Feb. 25, 2003. While circumventing the problems encountered by conventional metallic TDR in saline waters and cohesive soils, the system uses an expensive OTDR unit.

An embodiment of the present invention employs an optical reflection coefficient-based technique. See U.S. published patent application 20030117154 A1, Method and Instrument for Electronically Recording and Imaging Representations of the Interaction of an Object with Its Environment, by Yankielun and J. H. Clark, Jun. 26, 2003, incorporated herein by reference. Using this technique, one may detect, monitor and measure sediment transport in conductive water/sediment environments economically, continuously and in real-time.

This new technology improves the ability to perform sediment transport research, monitoring, and measurement in coastal zones, saltwater estuaries, embayments and other highly conductive waters, especially in cold regions and in the presence of ice. The system is not only applicable to saline and highly conductive environments but will function as well in freshwater regimes.

DETAILED DESCRIPTION

Figure 1:
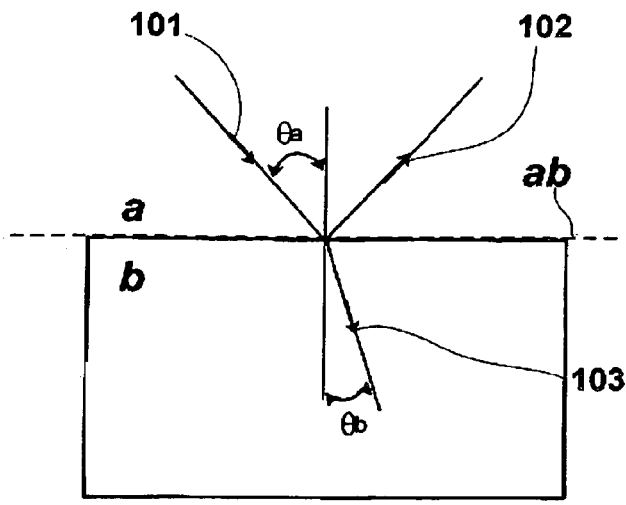
FIG. 1 depicts the physical geometry of light as it travels from a first medium to a second medium and is reflected back from the second medium as is known in prior art.

In general, a system is provided for monitoring and alerting to change in media. It comprises optical means for sensing change in characteristics of media and transmitting data representing the change; an array of these optical means in which an end of each optical means is affixed to a support having a long axis and each optical means is exposed orthogonal to the media with respect to the long axis; a means for energizing each optical means; a processing means communicating with the optical means; and a means for coupling together the optical means, the energizing means and the processing means. The array may be configured to provide a pre-specified level of detail regarding the change. Real time alerting is associated to the change and information related to the change is displayed and recorded by the processing means. Depending on its application, the system may include a control device and an anchoring device for installation.

An embodiment of the present invention monitors and alerts to change in media adjacent an installed part of the embodiment. It comprises an array of optical fibers affixed to a support, each optical fiber having an end exposed orthogonal to the media; a source to energize each optical fiber during operation; an optical coupler or splitter for each optical fiber; and a sub-system connected to each optical fiber during operation. The sub-system processes received data to provide real time alerting to the change and records and displays information corresponding thereto. An optical signal is maintained on each optical fiber during operation and the array may be configured to provide a pre-specified level of detail regarding a change.

The change may be indicated by a change in reflection coefficient, transmission coefficient, and combinations thereof. Data transmitted on the optical fibers, as well as the signals that energize the individual fibers, may be multiplexed in a pre-specified sequence.

The sub-system may further include a multi-channel multiplexed data acquisition printed circuit board incorporating an analog-to-digital converter connected to a personal computer having a display and software loadable on the personal computer for processing the data.

In one application, an embodiment of the present invention may be fitted with either or both of a control device and a heavy anchor for buried installation in sediments below a body of water.

A method for monitoring and alerting to change in media is also provided. In one embodiment, the method includes:

providing arrays of optical fibers in which the arrays are each affixed to a support having a long axis;

exposing an end of each optical fiber orthogonal to the media with respect to the long axis;

configuring each array to provide a pre-specified level of detail regarding the change;

impressing an optical signal from a source on each optical fiber; collecting the impressed optical signal and a response signal of the media to the impressed optical signal;

providing a sub-system to communicate with each optical fiber such that the sub-system processes the response to enable real time alerting to change and displays and records the change; and providing a coupler for connecting each optical fiber to the source and the sub-system.

Figure 2:
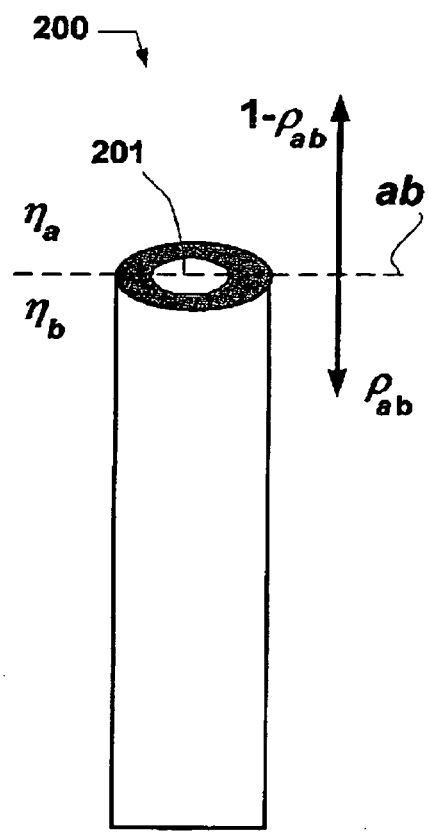
FIG. 2 shows a clad optical fiber presented normally to the interface between the first and second media of FIG. 1, as is known in the prior art.

Refer to FIGS. 1 and 2. Optical reflection 102 and transmission 101, 103 modes may be employed for the detection and measurement of the change in characteristics of material in contact with the terminal end of an optical fiber as shown at 201 in FIG. 2. In the case of reflection 102, optical principles following Snell's Law apply as follows. At an arbitrary refractive index interface boundary, ab, the reflection coefficient, $\rho_{ab}$ is defined as:

$$\rho_{ab} = \left| \frac{\eta_a \cos(\theta_b) - \eta_b \cos(\theta_a)}{\eta_a \cos(\theta_b) + \eta_b \cos(\theta_a)} \right| \quad (1)$$

where:

$\eta_a$=refractive index of material a at the interface boundary ab $\eta_b$=refractive index of material b at the interface boundary ab $\theta_a$=incident angle (with respect to vertical) of energy (light) in material a $\theta_b$=refractive angle (with respect to vertical) of energy (light) in material b.

Thus, with an incident angle ($\theta_a$ goes to zero) normal to the boundary ab and the associated refractive angle ($\theta_b$ goes to zero) that also is normal to the boundary ab, the reflection coefficient for an incident wave 101 that is normal to an arbitrary refractive index boundary discontinuity as at ab is:

$$\rho_{ab} = \left| \frac{\eta_a - \eta_b}{\eta_a + \eta_b} \right| \quad (2)$$

Complementing the reflection coefficient is the transmission coefficient, $\tau_{ab}$, representing the fraction of light energy that passes through the refractive index boundary ab, such that:

$$\tau_{ab} = 1 - \rho_{ab} \quad (3)$$

The relationship 200 between Eqns. (2) and (3) is illustrated in FIG. 2. Thus, the fraction of incident energy that is reflected is dependent on the relative magnitudes of the refractive indices, $\eta_a$, $\eta_b$, of the two materials that meet at an interface boundary ab.

For a sediment scour monitoring implementation using an embodiment of the present invention, the value of $\eta_a$ is fixed as the refractive index, $\eta_f$, of the fiber optic transmission medium. The value of the refractive index, $\eta_b$, varies if the "b" component of the boundary is water or saturated sediment. Although somewhat temperature dependent, water has a nominal refractive index of $\eta_\omega$, =1.3. Weast, R. C. (ed), *CRC Handbook of Chemistry and Physics*, CRC Press, Cleveland, Ohio, 58$^{th}$ edition, 1977. The core of the plastic optical fiber used in an embodiment of the present invention has an index of refraction of $\eta_f$=1.492. Industrial Fiber Optics, Inc., Product Catalog, Tempe, Ariz., 1999. Other optical fibers (either plastic or glass) with different characteristics may serve as well. The refractive index for other optical fibers may vary from this value, but should be selected to be different from that of water. The index of refraction, of the sedimentary material that may come in contact with the end of the clad optical fiber varies according to local mineralogy, granularity and packing efficiency as related by the sediment grain structure and the amount of water saturation thereof. The index of refraction from any sedimentary material is generally significantly different from both that of the overlying water and the optical fiber, even water that is muddy from runoff.

Figure 3:
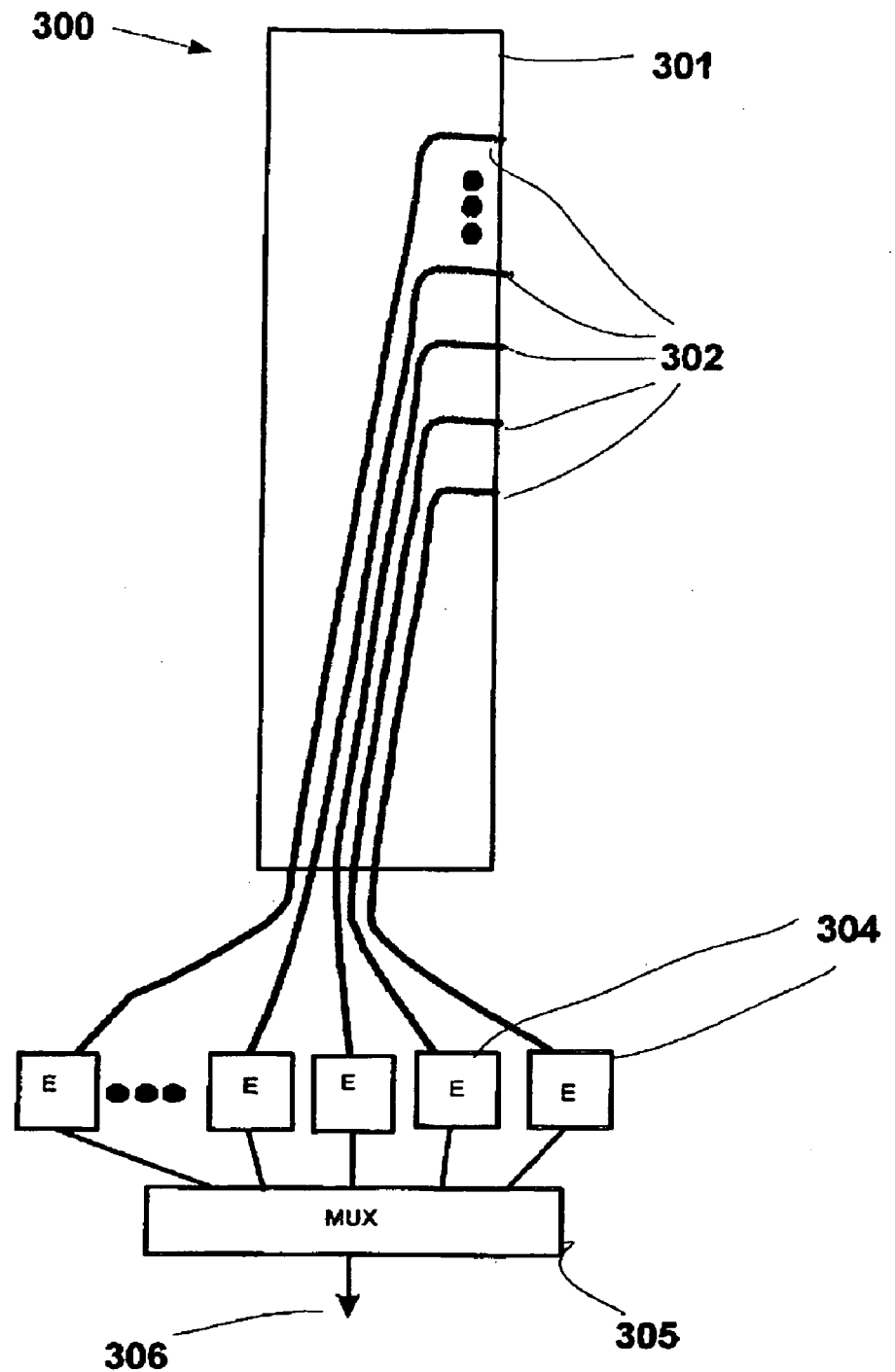
FIG. 3 is a vertical view of an embodiment of the present invention as it may be installed in a typical configuration.

Refer to FIG. 3. The fiber optic scour sensor 300 consists of a vertical array of numerous, single point optical fibers 302 appearing approximately flush with the profile of a vertical support structure 301. The opto-electronics packages 304 are indicated by the symbol "E" and the multiplexer 305 is identified as "MUX" with output 306 to an appropriate processor/display such as shown at 410 of FIG. 4. The optical fiber used in an embodiment of the present invention is a 1-mm, step index plastic fiber with a numerical aperture, NA, of 0.51, a core refractive index, $\eta_{co}$, of 1.492, a cladding refractive index, $\eta_{cl}$, of 1.402, and an attenuation of <0.20 dB/m. (Industrial Fiber Optics, Inc. 1999). Other optical fibers (either plastic or glass) with different characteristics may serve as well.

Figure 4:
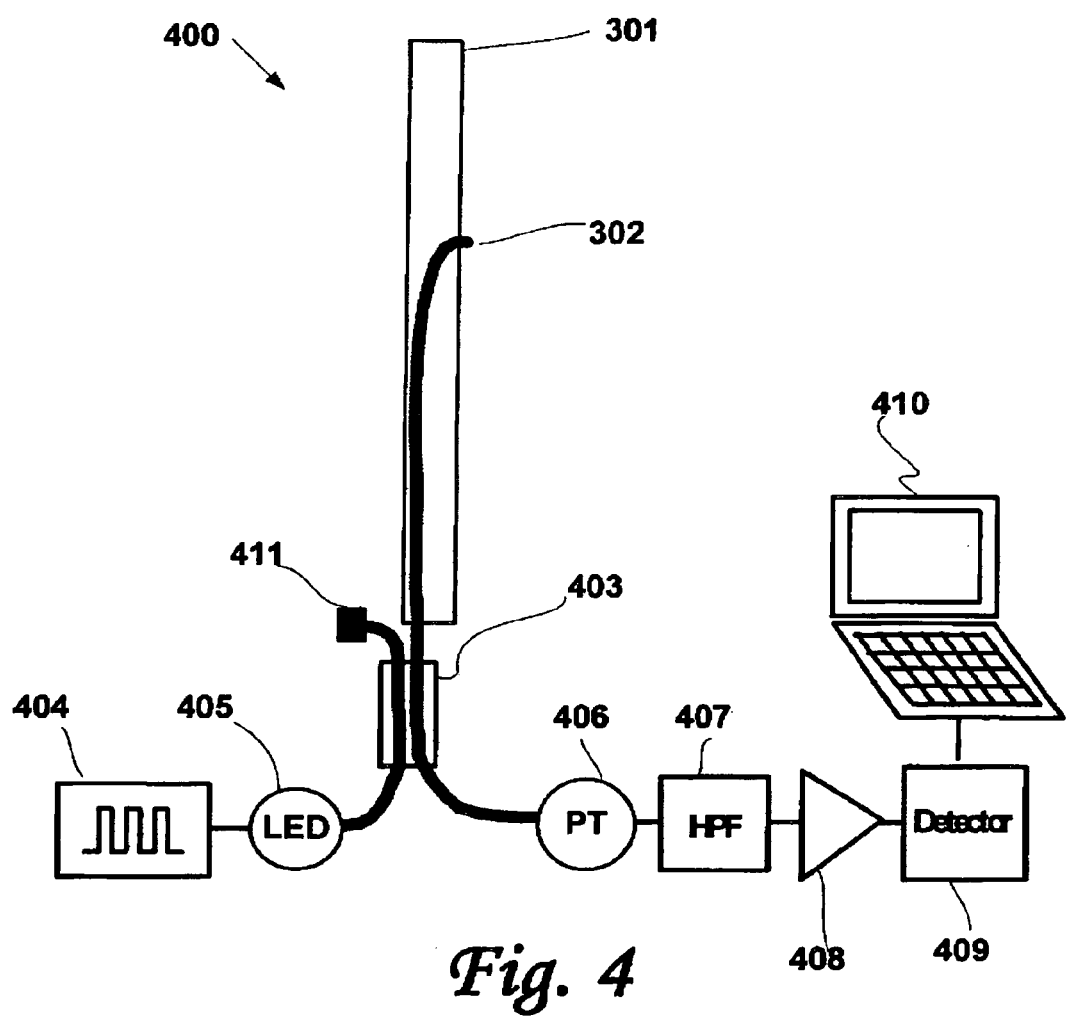
FIG. 4 is a schematic of an embodiment of the present invention, showing a single optical fiber collector for clarity.

Refer to FIG. 4, a block diagram 400 of a single sensor "module" and related energy sources, processors, controls and display used in an embodiment of the present invention. For clarity, the multiplexer 305 of FIG. 3 is not shown in FIG. 4. Each optical fiber 302 is part of an array (as shown in FIG. 3) inserted in a vertical support structure 301 and connected to its own optical coupler 403. Each optical coupler 403 is also connected to a multiplexer 305 for use with common source illumination circuitry 404, 405, processing circuitry 406, 407, 408, 409, and processor/display 410. In application specific embodiments, the processing circuitry may be embodied in the processor/display 410. In one embodiment of the present invention, the components 406, 407, 408, 409 may be incorporated on a printed circuit board internal to the processor display 410 or in an alternative embodiment they may be located within the probe assembly along with the other components 403, 404, 405.

The light source 405, typically an LED, is energized using a signal generator 404. This signal is passed through the multiplexer 305 to each of the optical couplers (splitters) 403. The return signal from the end of the optical fiber 302 is fed from the optical splitters 403 to the multiplexer 305 from which it is sent to the optical receiver 406, typically a phototransistor. The signal from the optical receiver 406 is sent to a high pass filter 407 to attain a "cleaner" signal which is then amplified by an amplifier 408 before passing to a detector 409 as input to a processor/display 410. The display may also contain control features, such as a keyboard for use by an operator in calibrating or operating the system 400. The multiplexer 305 permits each of the optical fibers 302 and their associated optical splitter 403 to share common source 405 and processing 406, 407, 408, 409 devices in a pre-specified sampling sequence.

Figure 6:
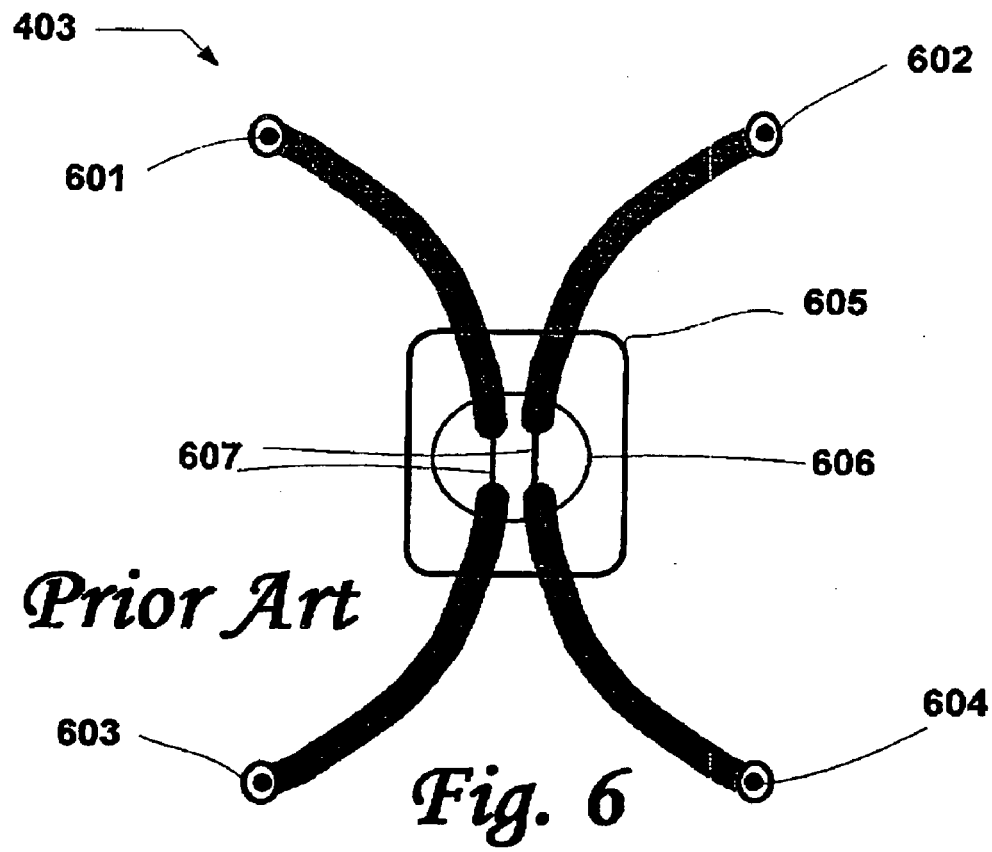
FIG. 6 depicts fiber optic ports used in an embodiment of the present invention.

Refer to FIG. 6 illustrating a typical commercially available optical coupler 403. The optical fibers 302 are stripped of cladding as at 607 within a coupling medium 606 that is encased in a light tight case 605. This enables energy impinging on each of the two fibers of the optical splitter 403 to be "shared" for purposes of both transmitting and receiving light energy. Light energy entering, for example, Port 2 602 is divided in half, with equal components exiting through Ports 3 603 and 4 604. Virtually no light entering Port 2 602 exits through Port 1 601. The device functions similarly for light entering any of the four ports 601, 602, 603, 604. The optical coupler 403 permits a single optical fiber 302 to act simultaneously as a receiver and transmitter of light energy. An optical receiver 406 (phototransistor, photo-diode or similar device), designated as a phototransistor in FIG. 4, is connected to one port of the splitter 403. In one embodiment of the present invention, a light source 405, shown as an LED in FIG. 4 and typically emitting visible (660-nm) red light, is connected to another port of the splitter 403. In an embodiment of the present invention as represented in FIG. 4, the last port is a dark termination 411 implemented by covering the aperture of the port with black plastic tape (not shown separately) or otherwise providing an optically non-reflective termination. If referencing to FIG. 6, Port 3 603 is connected to the light source 405, Port 4 604 is connected to the optical receiver 406, Port 2 602 is terminated in the vertical support 301, and Port 1 601 is a dark termination 411, e.g., covered with black plastic tape thus providing a non-reflective termination. All optical fibers 302 inserted in the vertical support 301 may be configured similarly.

Since the optical fibers 302 may be exposed to some degree of ambient light when submerged in shallow water, pickup of background light along with the reflected light from the light source 405 would also be sensed by the optical receiver 406 and interfere with accurate scour depth measurement. There are at least two potential solutions to eliminate this interference.

Figure 5:
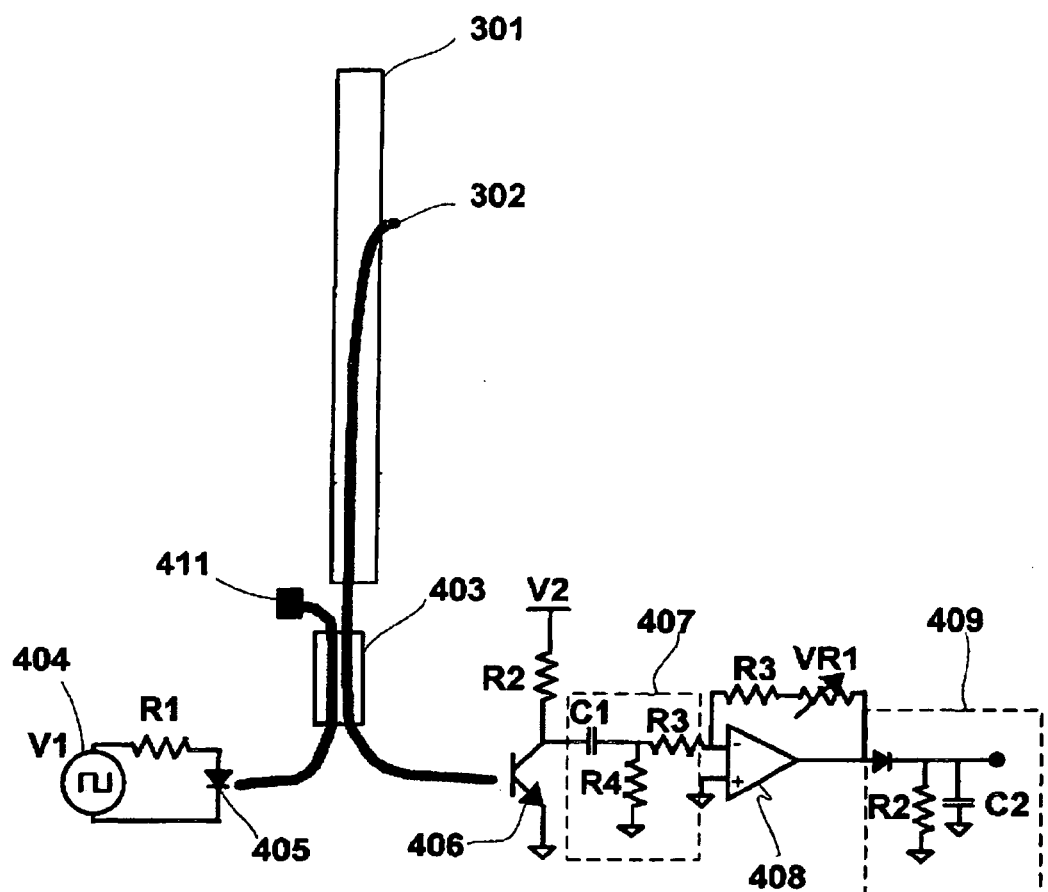
FIG. 5 depicts representative circuits that may be used in the schematic of FIG. 4.

Refer to FIGS. 4 and 5. Using a light source 405 operating at a wavelength different from that of ambient light and appropriate optical bandpass filtering 407 at the photo sensor (receiver) 406 eliminates interference from the ambient light.

In one embodiment of the present invention, the time-varying intensity of natural ambient lighting is exploited. In most circumstances the intensity of natural ambient light tends to vary relatively slowly with time (e.g., diurnal cycle, passage of clouds, etc.). To eliminate the interfering effects of ambient lighting, a 3-kHz square wave source 404 is used to modulate a visible light source 405, typically an LED. The signal received by each phototransistor (receiver) 406 is sent to a high-pass filter 407, thus eliminating any of the low-frequency components of the signal and permitting further analog processing of the received 3-kHz signal. This filtered signal is forwarded to an amplifier 408 and peak rectified in a detector 409, resulting in a DC voltage proportional to the intensity of the received signal. The output of the peak rectifier 409 is digitized using a 16-bit PCMCIA A/D card (not shown separately) as may be installed in a processor/display 410 such as a laptop computer, desktop computer, or a dedicated application specification processor. The subsequent data stream is processed, stored and may be displayed in real time on the display associated with the processor/display 410. Values suitable for use with this embodiment of the present invention include at V1 a 10-Volt P-P 3-Khz generator, at V2 a 15 V power source, a red light LED 405, a phototransistor 406, an 1N914 diode, resistors having values as follows: R1=470Ω, R2=20 KΩ, R3=4.7 KΩ, R4=60 KΩ, a "variable resistor" or "potentiometer" VR1=47 KΩ, and capacitors having values: C1=0.01 μF, C2=0.047 μF.

Figure 7:
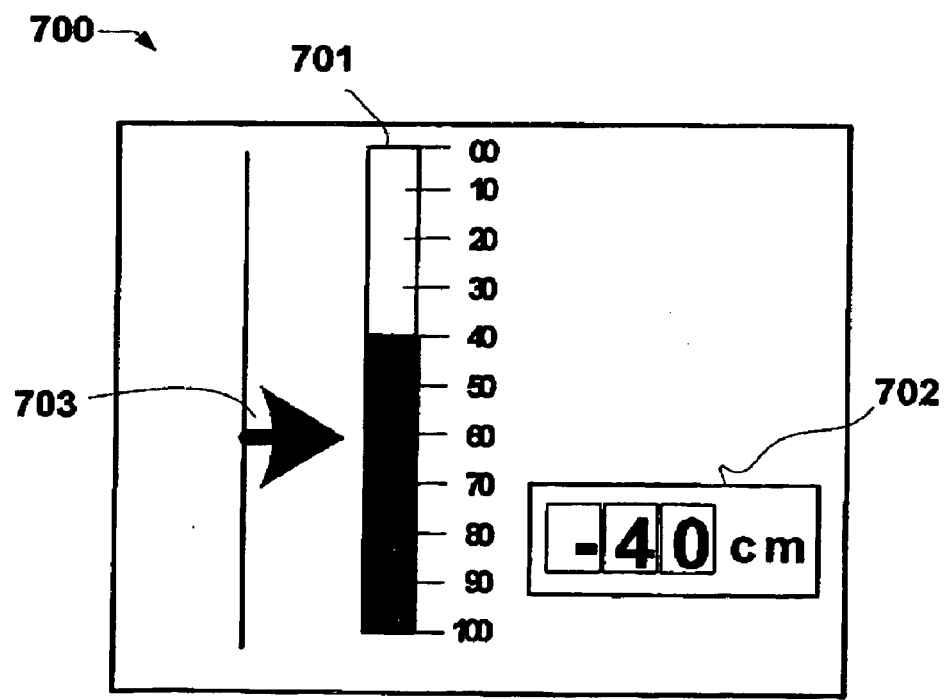
FIG. 7 shows a display that may be used with an embodiment of the present invention.

In one embodiment of the present invention, the data acquisition, processing and display software is written in LABVIEW®, a GUI-based language. Other convenient or appropriate computer language may be employed. Custom displays or display formats suitable for use on existing CRTs or LCDs may be developed for clear indication of scour conditions. For example, FIG. 7 depicts a dual display 700 suitable for use with a personal computer. It includes a vertical "thermometer-like" display 701 to show the dynamic change in scour level and a numeric display 702 to give an absolute or relative indication of scour depth in engineering units, accurate to the spatial resolution, i.e., the separation of optical fibers 302 in the sensor 300 of FIG. 3. Further, an alert function may be programmed into the processor to indicate when scour has reached a critical level such as displayed at the arrow 703.

Figure 9:
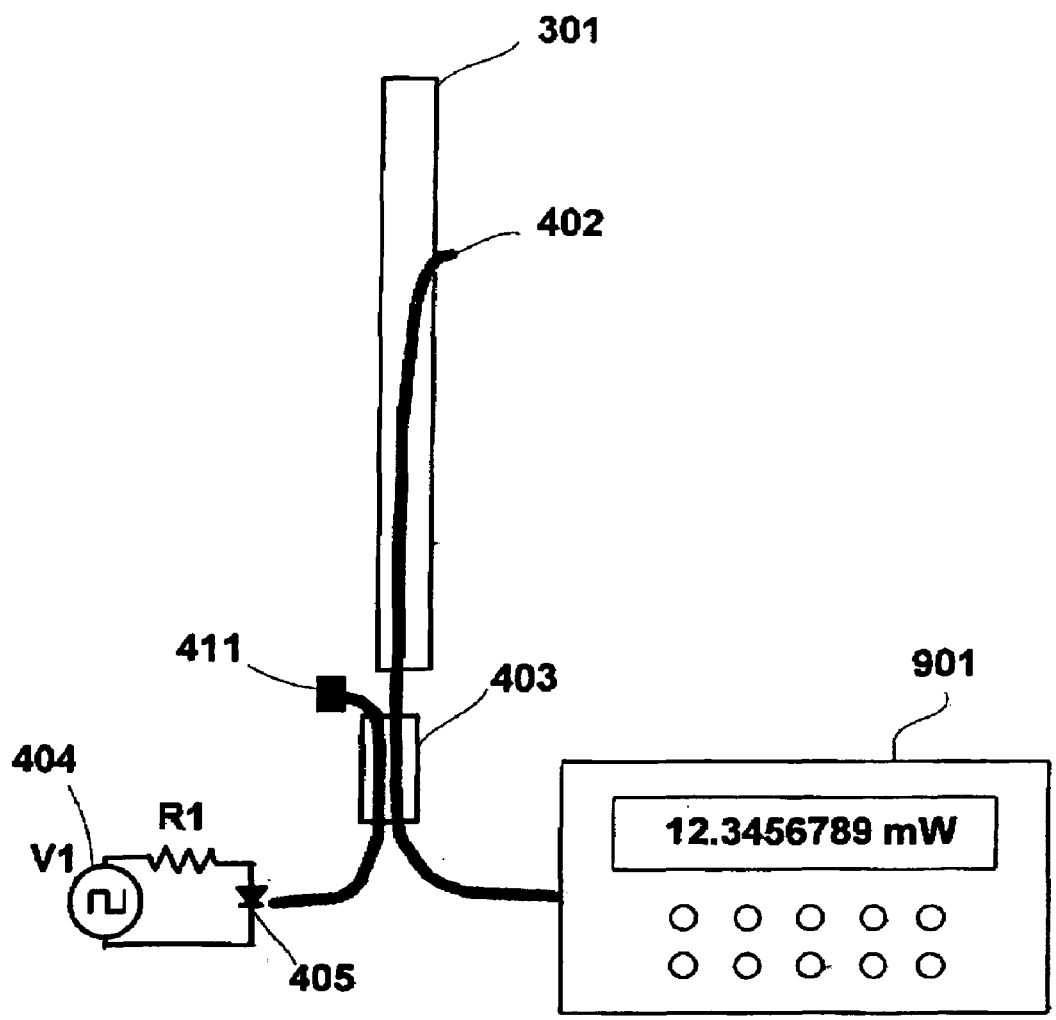
FIG. 9 depicts an alternative to some of the representative circuits employed in FIG. 5.

Refer to FIG. 9. Depending on implementation specifics, embodiments of the present invention may have the optical receiver 406, source 405 and splitters 403 replaced with an optical power meter 901 that measures the reflected photonic power present in an optical path. A power meter 901 provides a more sophisticated (and expensive) implementation that monitors the power of both the transmitted and the reflected optical signal while producing an output proportional to the normalized reflected power. This embodiment also functions under the principle of changing reflectance levels at the end of an optical fiber 302 as a function of a change in the refractive index contrast at the boundary ab of the optical fiber path and the overlying sediment or water column. If the optical path terminates into saturated sediment, there will be a specific and measurable level of reflectance. If the terminal end of the optical path is terminated, instead, into water (as would occur during scour) a different level of reflectance is measured. By noting the difference between reflectance levels occurring with sediment and water, scour may be dynamically monitored. When using an optical power meter 901, the power meter 901 may be located "high and dry" on the shoreline and coupled to the fiber scour sensor 300 by a series of optical fibers 302, or via a single optical fiber 302 and fiber multiplexer 305 located in the submerged scour probe 300.

Figure 8:
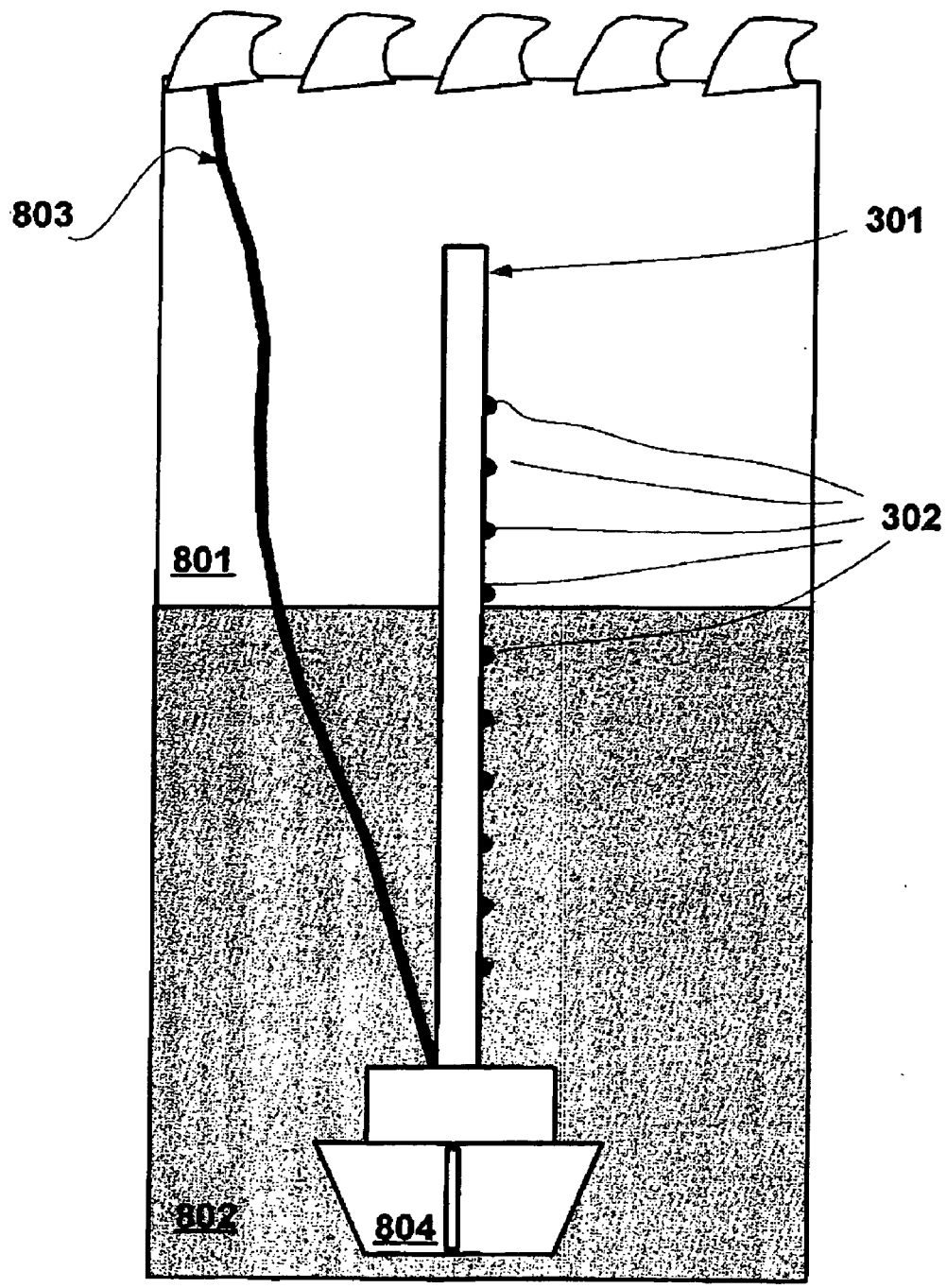
FIG. 8 depicts an embodiment of the present invention as it would be installed in sediment below a body of water.

Refer to FIG. 8. With the appropriate hardware, an embodiment of the present invention may be implemented using a directly connected optical or metallic umbilical cable 803. Additionally an embodiment may be implemented with a radio, ultrasonic, or other form of remote telemetry (not shown separately) to transmit scour status from the buried optical probe 300 to an on-shore monitoring and data storage system such as that described as elements 406, 407, 408, 409 and 410.

In the case of a highly saline environment, e.g., seawater, the radio telemetry method is impractical because of the losses suffered by the radio signal propagating through a lossy medium. Additionally, an implementation using batteries and a wireless means (all not shown separately), such as a radio or submerged acoustic telemetry link, is most suitable for shorter-term applications in which the probe is either disposable or retrievable for refurbishment and replacement of batteries. An umbilical cable-based system as depicted in FIG. 8 is intended primarily for long-term or permanent monitoring situations where the umbilical cable 803 may be easily and more permanently installed and used in electrically lossy environments. Further, the sub-system that receives and processes sensor data may be operated in a more benign environment than the probe 301, 302 itself.

In one application, an embodiment of the present invention is buried in river bottom sediments 802 below water 801 in a body of water being monitored for scour. It is emplaced via a heavy anchor 804 at a point below the maximum expected depth of scour. Primarily, an embodiment of the present invention is designed for installation by "air jetting" or "hydro jetting". Alternatively, it may be installed in softer sediments by being "pile driven" or hydraulically forced into the sediment 802. In one embodiment of the present invention, the top of the installed probe is "surveyed in" relative to a local survey benchmark.

Depending on the desired implementation, output signals of an embodiment of the present invention may be further multiplexed to monitor a distributed array consisting of numerous probes (each having a vertical array of optical fibers 302 as shown in FIG. 3) installed in close proximity to a structure or sediment field of interest.

There are advantages to the implementation of an optical time domain reflectometer for scour monitoring:

- can operate in brackish, saline or otherwise electrically conductive waters or other fluids,
- able to operate in environments where magnetic or metallic transmission lines may interfere with data taking, and
- media does not have to be transparent nor translucent for operation.

Numerous industrial, commercial, and military instrumentation and measurement systems can take advantage of this technique. Some potential applications include:

- material depth and clarity change measurement/monitoring in industrial tanks such as plating tanks,
- clarity monitoring and control of weirs,
- environmental monitoring in conductive environs, e.g., between layers of double layer underground storage tanks,
- monitoring of oil reservoirs of internal combustion engines to detect when oil needs to be added and when an oil change is necessary,
- bridge scour measurement/monitoring,
- navigation channel sedimentation monitoring,
- dredging spoils stability monitoring, and
- coastal sediment monitoring.

Although only a few exemplary embodiments of this invention have been described in detail above, those skilled in the art will readily appreciate that many modifications are possible in the exemplary embodiments without materially departing from the novel teachings and advantages of the invention. Accordingly, all such modifications are intended to be included within the scope of this invention as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

The abstract of the disclosure is provided to comply with the rules requiring an abstract, which will allow a searcher to quickly ascertain the subject matter of the technical disclosure of any patent issued from this disclosure. 37 CFR § 1.72(b). Any advantages and benefits described may not apply to all embodiments of the invention.

I claim:

1. A system for monitoring and alerting to change in media situated in an unenclosed natural environment adjacent a part of said system, comprising:
    at least one array of parallel optical fibers, each said fiber of a different length one from the other and each said fiber incorporating an approximately right angle bend at its terminus in said media, said array affixed to an external surface of a support immersed in water and sediment in said unenclosed natural environment, said support having a length, width and depth,
    wherein said array communicates a pre-specified level of detail as data regarding said change, said level of detail permitting determination of at least the relative level of said water and said sediment about said support;
    at least one source of optical signals in operable communication with each said optical fiber at least during a portion of operation of said system;
    at least one optical coupler in operable communication with each of said optical fibers; and
    at least one sub-system in operable communication with each said optical fiber
    at least during a portion of operation of said system,
    wherein said data are processed by said sub-system to provide measurement of and alerting to said change, and
    wherein said change may be recorded and displayed via said sub-system.

2. The system of claim 1 in which said data regarding said change are selected from the group consisting of: reflection coefficients, transmission coefficients, and combinations thereof.

3. The system of claim 1 further comprising a multiplexer, wherein said multiplexer may be employed to energize said optical fibers in a pre-specified sequence.

4. The system of claim 1 said optical fibers arranged in at least one vertical array upon a rigid support.

5. The system of claim 1 in which said optical fibers are plastic.

6. The system of claim 1 in which said optical fibers have an index of refraction of approximately 1.492.

7. The system of claim 1 in which said optical fibers are each incorporated as one of a pair in said optical coupler.

8. The system of claim 1 in which said sub-system includes at least an optical receiver, a high pass filter, an amplifier, a detector and a display.

9. The system of claims 8 further comprising a control device.

10. The system of claim 1 in which said sub-system comprises at least a power meter.

11. The system of claim 10 further comprising a processing and control device incorporating a display.

12. The system of claim 3 further comprising an umbilical cable in operable communication with at least said multiplexer, said source and said sub-system.

13. The system of claim 1 further comprising an anchoring device.

14. The system of claim 1 in which said source is a light emitting diode (LED).

15. The system of claim 14 in which said LED emits red light.

16. The system of claim 1 in which at least one of said optical signals is provided as a cyclical signal.

17. The system of claim 16 in which said cyclical signal is a square wave.

18. The system of claim 17 in which said square wave is cycled at approximately three KHz.

19. The system of claim 8 in which said optical receiver is selected from the group consisting of a phototransistor, a photodiode, and combinations thereof.

20. The system of claim 1 in which said sub-system further comprises:
   at least one multi-channel multiplexed data acquisition printed circuit board incorporating at least one analog-to-digital converter;
   at least one personal computer, incorporating a display, in operable communication with said multi-channel multiplexed data acquisition printed circuit board; and
   software loadable on said personal computer for processing said data.

21. The system of claim 1 in which said coupler is a four-port optical splitter.

22. A system for monitoring and alerting to change in media situated in an unenclosed natural environment, comprising:
   at least one optical means for sensing change in at least one characteristic of said media and transmitting data representing said change;
   at least one array of parallel said optical means, each said means of a different length one from the other and each said means incorporating an approximately right angle bend at its terminus in said media,
wherein an end of each said optical means is affixed to an external surface of a support immersed in water and sediment in said unenclosed natural environment, said support having a length, width and depth, and
wherein said array communicates a pre-specified level of detail as data regarding said change, said level of detail permitting determination of at least the relative level of said water and said sediment about said support, and
wherein said array communicates a pre-specified level of detail regarding said change, said level of detail permitting determination of at least the relative level of said water and said sediment about said support;
   at least one means for energizing each said optical means, said means for energizing in operable communication with each said optical means;
   at least one means for processing said data, said means for processing in operable communication with each said optical means,
wherein said means for processing provides measurement of and alerting to said change, and
wherein said means for processing displays and records said change; and
   at least one means for coupling together said optical means, said means for energizing and said means for processing.

23. A method for monitoring and alerting to change in media situated in an unenclosed natural environment, comprising:
   providing at least one array having at least one optical fiber, each said fiber of a different length one from the other and each said fiber incorporating an approximately right angle bend at its terminus in said media, said array affixed to an external surface of at least one support immersed in water and sediment in said unenclosed natural environment, said support having a length, width and depth;
   configuring said array to provide a pre-specified level of detail regarding said change, said level of detail permitting determination of at least the relative level of said water and said sediment about said support;
   impressing an optical signal from at least one source on each said optical fiber in said array;
   collecting said impressed optical signal and a response signal of said media to said impressed optical signal;
   providing a sub-system in operable communication with each said optical fiber,
wherein said sub-system processes said response to enable measurement of and alerting to said change, and
wherein said sub-system displays and records said change; and
   providing at least one coupler in operable communication with each said optical fiber, said source, and said sub-system.

* * * * *